No. 706,821. Patented Aug. 12, 1902.
H. HART.
PLANT POT OR HOLDER.
(Application filed Dec. 3, 1901.)
(No Model.)
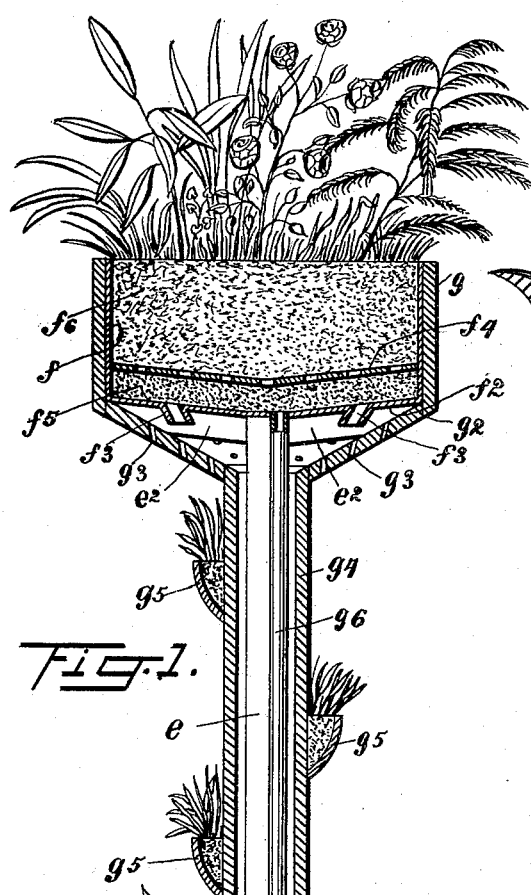
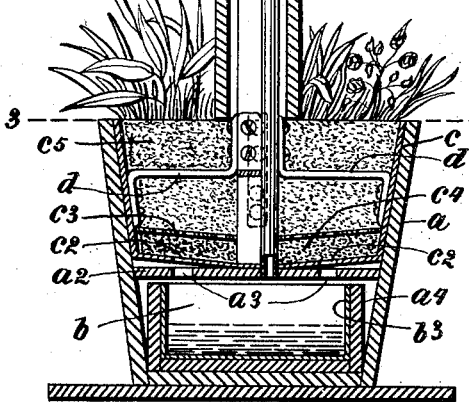
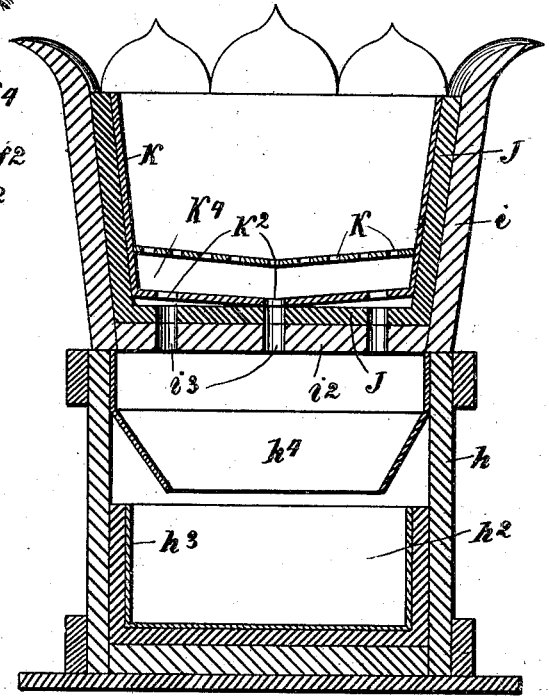
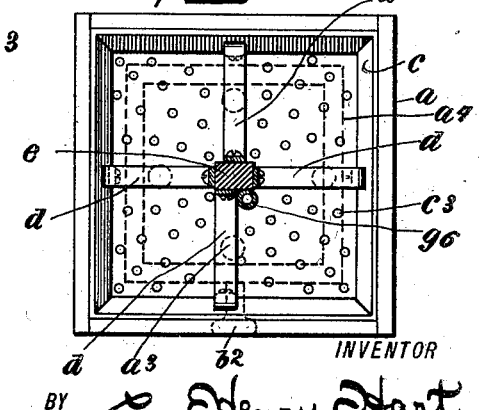
WITNESSES
INVENTOR
BY
ATTORNEYS

UNITED STATES PATENT OFFICE.

HENRY HART, OF NEW YORK, N. Y.

PLANT POT OR HOLDER.

SPECIFICATION forming part of Letters Patent No. 706,821, dated August 12, 1902.

Application filed December 3, 1901. Serial No. 84,523. (No model.)

*To all whom it may concern:*

Be it known that I, HENRY HART, a citizen of the United States, residing at New York, in the county of New York and State of New York, have invented certain new and useful Improvements in Plant Pots or Holders, of which the following is a full and complete specification, such as will enable those skilled in the art to which it appertains to make and use the same.

The object of this invention is to provide an improved plant pot or holder which is so constructed as to facilitate the watering of the plants and in which rich earth or fertilizing material may be employed without producing offensive odors; and with these and other objects in view the invention consists in a pot or holder for plants or flowers constructed as hereinafter described and claimed.

In the drawings forming part of this specification, in which the separate parts of my improvement are designated by the same reference characters in each of the views, Figure 1 is a sectional side elevation of a plant-holder; Fig. 2, a similar view showing a modification, and Fig. 3 a section on the line 3 3 of Fig. 1.

In the practice of my invention, reference being made to Fig. 1, I provide a receptacle $a$, which is preferably tub-shaped in form and which is also preferably composed of wood, and this receptacle is provided with a transverse partition $a^2$, below which is a space or chamber $a^3$, adapted to receive a drawer $b$, said drawer $b$ being provided at one side with a knob or handle $b^2$, which is shown in dotted lines in Fig. 3, and said drawer is also preferably provided with a lining $b^3$, of any suitable metal, which is preferably galvanized to prevent corrosion or rust. The upper portion of the receptacle $a$ is also provided with a supplemental tub or receptacle $c$, which fits tightly therein and which is also preferably composed of galvanized metal or other material which will not corrode or be injuriously affected by water or other liquids, and the bottom of this tub or receptacle $c$ is perforated, as shown at $c^2$, and corresponding perforations or openings $a^4$ are formed in the partition $a^2$ of the receptacle $a$. The tub or receptacle $c$ is provided with a transverse partition $c^3$, whereby a chamber or space $c^4$ is formed between said partition $c^3$ and the bottom of the tub or receptacle $c$, and this chamber or space in practice is filled with finely-divided charcoal, and the tub or receptacle $c$, above the partition $c^3$, is filled with rich earth, which may be partially composed of manure or any suitable fertilizing material, as shown at $c^5$. Fixed centrally in the tub or receptacle $c$ and secured therein by radial side arms $d$ is a central post $e$, said side arms being secured to the tub or receptacle $c$ and to said post by means of angular end extensions, the end extensions of said arms which are secured to said post being directed upwardly, while those that are secured to the walls of the tub or receptacle $c$ are directed downwardly, as shown in the drawings. The post $e$ is provided at its upper end with radial arms $e^2$, two of which are shown in Fig. 1, but four of which are preferably employed, and resting on these arms and on said post is a receptacle $f$, composed of galvanized iron or other metal which will not corrode or be injuriously affected by liquids, and the bottom $f^2$ of this receptacle is provided with perforations or tubular openings $f^3$, and placed therein at a predetermined distance above the bottom is a perforated partition $f^4$, between which and the bottom $f^2$ is a space or chamber $f^5$, filled with finely-divided charcoal, and the receptacle $f$ above the perforated partition $f^4$ is filled with rich earth, as shown at $f^6$, and this rich earth may consist partially of manure or fertilizing material, if desired. The receptacle $f$ is inclosed by a casing $g$, which may be composed of wood, bark, or any suitable material, and below this is a conical casing $g^2$, of similar material, which is perforated, as shown at $g^3$, and a tubular casing $g^4$ incloses the post $e$ and is connected with the bottom or apex of the conical casing $g^2$, said tubular casing $g^4$ being also composed of wood or bark or of any suitable material. The tubular casing $g^4$ is provided with open receptacles $g^5$, which are secured thereto in any desired manner and in which are also placed rich earths, and the tub or receptacle $c$, the receptacle $f$, and the receptacles $g^5$ are each and all designed to hold plants or flowers, as shown in Fig. 1. A tube $g^6$ is also preferably connected with the bottom of the receptacle $f$ and passes down through the tubular casing $g^4$, adjacent to the post $e$, and through the partition $a^2$ in the receptacle $a$, and by means of this construction water poured into the top receptacle $f$ will permeate the earth therein, and some of it will pass through the partition $f^4$ and through the charcoal and through the bottom $f^2$ of the receptacle $f$. A part of the water which passes through the bottom $f^2$ of the receptacle $f$ will pass through the perforations $g^3$ in the conical casing $g^2$ and will flow down the outside of the tubular casing $g^4$ into the receptacles $g^5$, and some of this water will also flow downwardly into the receptacle or tub $c$. A part of the water which passes through the bottom $f^2$ of the receptacle $f$ will also pass downwardly through the tubular casing $g^4$ into the tub or receptacle $c$, and a portion of the water from the receptacle $f$ will pass down through the tube $g^6$ into the drawer $b$. By means of this construction the earth $c^5$ in the receptacle or tub $c$ will also be kept moist, and the water therein will permeate the said earth and flow through the charcoal between the partition $c^3$ and the bottom of the tub or receptacle $c$, and said water will flow through the openings $a^3$ in the partition $a^2$ of the receptacle $a$ of the drawer $b$. The passage of the water through the charcoal in the bottom of the receptacle $f$ and in the bottom of the tub or receptacle $c$ will purify such water, and this charcoal operates to remove all odors which would otherwise be occasioned by the manure or fertilizing material in the receptacles $f$, $c$, and $g^5$, and the water which flows into the drawer $b$ may be again used, as will be readily understood.

In Fig. 2 I have shown a modification of the construction shown in Fig. 1, which comprises a base-receptacle $h$, in which is placed a drawer $h^2$, lined, as shown at $h^3$, with galvanized metal or any other suitable material, and in the top of the receptacle $h$ is placed a conical member $h^4$, the apex or smaller portion of which is directed downwardly and the upper portion of which is cylindrical in form, and secured in the top of the receptacle $h$ and above the receptacle $h^4$ is placed a tub $i$, having a bottom $i^2$, provided with openings $i^3$, and within this tub $i$, which is composed of wood, bark, or similar material, is a supplemental tub $j$, composed of wood and provided with a bottom $j^2$, which is perforated to correspond with the perforations $i^3$ in the bottom of the tub $i$, and within the supplemental tub $j$ is placed a metal casing $k$, similar in form, and the bottom of which is perforated, as shown at $k^2$, which perforations correspond with those in the bottom of the tub $j$ and in the bottom of the tub $i$, and said tub $k$ is provided with a perforated partition $k^3$, between which and the bottom thereof is a space or chamber $k^4$, designed to receive finely-divided charcoal, and in practice rich earths or other material are placed in the tub $k$, and plants or flowers are also placed therein.

The parts of this device may be composed of any desired material; but in practice the outer portion or the visible portions are preferably composed of or covered with bark, while the parts in which the earth or earths are placed and which are designed to receive water are composed of galvanized iron or other material which will not corrode or be injuriously affected by liquids. With this construction water when poured into the tub $k$ or into the earths, which are first placed therein, passes downwardly through the partition $k^3$ and through the charcoal in the chamber $k^4$ and through the bottoms of the tubs $k$, $j$, and $i$ and into the drawer $h^2$, and in this respect the operation is the same as with the construction shown in Fig. 1.

It is a well-known fact that plants watered in pots or jardiniers in the usual manner are often killed by the water which remains in the bottom of the pot or jardinier, which sours, thus destroying the life-giving quality of the earth or earths and also rots the roots of the plants; but by means of my improved construction the surplus water does not remain in the bottom of the plant-holder, but passes out and is finally received by the drawer in the bottom of the bottom tub or receptacle, and this constitutes one of the chief features of my invention.

Having thus fully described my invention, what I claim as new, and desire to secure by Letters Patent, is—

1. A plant or flower holder comprising a tub or receptacle having a drawer in the bottom thereof, a supplemental tub or receptacle placed therein over said drawer, and provided with a transverse perforated partition and a perforated bottom, a post secured in said supplemental tub or receptacle, and a top tub or receptacle secured on the top of said post and provided with a transverse perforated partition, and a perforated bottom, the bottom of said last-named tub or receptacle being provided with a casing, the bottom of which is conical in form and perforated and a tubular casing connected with the bottom of said casing, and inclosing said post, substantially as shown and described.

2. A plant or flower holder comprising a tub or receptacle having a drawer in the bottom thereof, a supplemental tub or receptacle placed therein over said drawer, and provided with a transverse perforated partition and a perforated bottom, a post secured in said supplemental tub or receptacle and a top tub or receptacle secured on the top of said post and provided with a transverse perforated partition, and a perforated bottom, the bottom of said last-named tub or receptacle being provided with a casing, the bottom of which is conical in form and perforated and a tubular casing connected with the bottom of said casing, and inclosing said post, said tubular casing being provided with side receptacles which are secured thereto, substantially as shown and described.

3. A plant or flower holder comprising a tub or receptacle having a drawer in the bottom thereof, a supplemental tub or receptacle placed therein over said drawer, and provided with a transverse perforated partition and a perforated bottom, a post secured in said supplemental tub or receptacle and a top tub or receptacle secured on the top of said post and provided with a transverse perforated partition, and a perforated bottom, the bottom of said last-named tub or receptacle being provided with a casing, the bottom of which is conical in form and perforated and a tubular casing connected with the bottom of said casing, and inclosing said post, said tubular casing being provided with side receptacles which are secured thereto, and a tube connected with the bottom of the top tub or receptacle and extending downwardly adjacent to said post, through said tubular casing and communicating with the drawer in the bottom of the first-named receptacle, substantially as shown and described.

4. A plant or flower holder comprising a receptacle having a drawer in the bottom thereof, a perforated partition above said drawer, a tub placed over said perforated partition and provided with a perforated bottom, said tub being also provided with a perforated partition, charcoal placed between said partition and the bottom of said tub the top portion of said tub being adapted to receive earths, substantially as shown and described.

In testimony that I claim the foregoing as my invention I have signed my name, in presence of the subscribing witnesses, this 29th day of November, 1901.

HENRY HART.

Witnesses:
JOHN J. KAVANAGH,
THEODORE HADEL.